(12) United States Patent
Midden et al.

(10) Patent No.: US 9,386,878 B2
(45) Date of Patent: Jul. 12, 2016

(54) MILK HEATING AND DISPENSING AND FLAVOR DISPENSING SYSTEM, METHOD, AND APPARATUS

(71) Applicant: BUNN-O-MATIC CORPORATION, Springfield, IL (US)

(72) Inventors: William E. Midden, Springfield, IL (US); Suresh Radhakrishnan, Springfield, IL (US); Rex Allen Rogers, Springfield, IL (US); Daniel Hansen, Springfield, IL (US); John Bodjack, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 14/374,443

(22) PCT Filed: Jan. 24, 2013

(86) PCT No.: PCT/US2013/022970
§ 371 (c)(1),
(2) Date: Jul. 24, 2014

(87) PCT Pub. No.: WO2013/112724
PCT Pub. Date: Aug. 1, 2013

(65) Prior Publication Data
US 2015/0020691 A1    Jan. 22, 2015

Related U.S. Application Data

(60) Provisional application No. 61/590,160, filed on Jan. 24, 2012.

(51) Int. Cl.
*A23F 3/00* (2006.01)
*A47J 31/44* (2006.01)

(52) U.S. Cl.
CPC .................... *A47J 31/4485* (2013.01)

(58) Field of Classification Search
CPC ........................................ A47J 31/41
USPC ......... 426/474, 477, 590, 591, 592, 593, 594, 426/595, 596, 597, 598; 99/323.3, 293, 99/275, 455, 453
See application file for complete search history.

(56) References Cited

U.S. PATENT DOCUMENTS

| 6,019,032 A * | 2/2000 | Arksey ............................ 99/452 |
| 2006/0286262 A1 * | 12/2006 | Stearns et al. ................ 426/596 |

FOREIGN PATENT DOCUMENTS

WO    WO 2009/018672        2/2009

OTHER PUBLICATIONS

Search Report and Written Opinion issued in App. No. PCT/US2013/022970 (2013).

*Primary Examiner* — Phuong Nguyen
(74) *Attorney, Agent, or Firm* — Barnes & Thornburg LLP

(57) ABSTRACT

The present disclosure includes a milk heating system, methods, and apparatus for combining milk, which is heated, ambient, or chilled, selectively with or without being infused with air, and selectively dispensed with or without flavorings. The apparatus and method disclosed includes structures for selectively combining milk with air and flavorings to dispense a selected combination of ingredients. The assembly includes a dispensing head assembly having a flavoring dispensing component and a milk dispensing component. The flavoring dispensing component can be coupled to the milk dispensing component for combining ingredients and dispensing into a container. The milk dispensing component includes a single path for the introduction of a flow of milk and a single path for the introduction of steam. The milk path and steam path are oriented to be fed into an intermediate passage which communicates with a swirl cavity defined by the mixing chamber. The introduction of milk and steam is controlled to provide a variety of selected conditions of the resulting combination. The flavor dispensing component introduces flavorings at least partially downstream from the mixing of the milk and steam to produce one or more flavorings with the milk component.

14 Claims, 14 Drawing Sheets

MILK HEATING AND DISPENSING AND FLAVOR DISPENSING SYSTEM, METHOD, AND APPARATUS

CROSS REFERENCE TO RELATED APPLICATIONS

This application is a U.S. nationalization under 35 U.S.C. §371 of International Application No. PCT/US2013/022970, filed Jan. 24, 2013, which claims the benefit of priority under 35 U.S.C. §119(e) to U.S. Provisional Patent Application No. 61/590,160, filed Jan. 24, 2012. The disclosures set forth in the referenced applications are incorporated herein by reference in their entireties.

BACKGROUND

The present disclosure includes a milk heating system, methods, and apparatus for combining milk, which is heated, ambient, or chilled, selectively with or without being infused with air, and selectively dispensed with or without flavorings. The apparatus and method disclosed includes structures for selectively combining milk with air and flavorings to dispense a selected combination of ingredients. The assembly includes a dispensing head assembly having a flavoring dispensing component and a milk dispensing component. The flavoring dispensing component can be coupled to the milk dispensing component for combining ingredients and dispensing into a container. The milk dispensing component includes a single path for the introduction of a flow of milk and a single path for the introduction of steam. The milk path and steam path are oriented to be fed into an intermediate passage which communicates with a swirl cavity defined by the mixing chamber. The introduction of milk and steam is controlled to provide a variety of selected conditions of the resulting combination. The flavor dispensing component introduces flavorings at least partially downstream from the mixing of the milk and steam to produce one or more flavorings with the milk component.

By way of background, a variety of milk mixing and dispensing systems have been devised. Many of these milk systems are used with coffee dispensing systems and especially espresso dispensing systems to produce cappuccino and latte beverages. The milk systems may be used independently or without coffee or other ingredients to produce steamed milk or frothed milk for a variety of uses. However, these systems are commonly used with espresso systems which may produce either coffee, tea, or other beverages including a milk ingredient.

On of the complications with milk systems is the accurate control of the milk product output. In this regard, a variety of systems mix milk and steam to produce a foamed or froth milk product. However, complications arise when other resulting milk products are desired. As an example, some systems which produce desired results for milk frothing or foaming cannot produce heated milk without the froth or foam. Similarly, systems which produce heated milk in a variety of conditions may not be capable of producing unheated milk, including chilled or ambient milk, with froth.

Some of these systems work with the dispensing of flavors. However, the flavor dispensing systems tend to deposit the flavoring in the milk stream 100 which can produce potential cross-contamination of flavorings. Further, the introduction of flavorings at an inappropriate portion of the mixing path can result in undesired results. The flavorings, having a different chemical composition than the milk ingredients can alter the chemical composition of the milk which has been acted on by steam. As a result, the flavorings can alter the flavoring or froth structure of the milk. Further, some systems may deposit the flavoring independent of the milk. This may be undesirable as separation may occur and the flavorings may not fully mix with the milk to produce the desired finished drink.

This background information provides some information believed by the applicant to be of possible relevance to the present disclosure. No admission is intended, nor should such admission be inferred or construed, that any of the preceding information constitutes prior art against the present invention. Other aims, objects, advantages and features of the invention will become more apparent upon reading of the following non-restrictive description of specific embodiments thereof, given by way of example only with reference to the accompanying drawings.

BRIEF DESCRIPTION OF THE DRAWINGS

The present disclosure will be described hereafter with reference to the attached drawings which are given as a non-limiting example only, in which.

Figure 1:
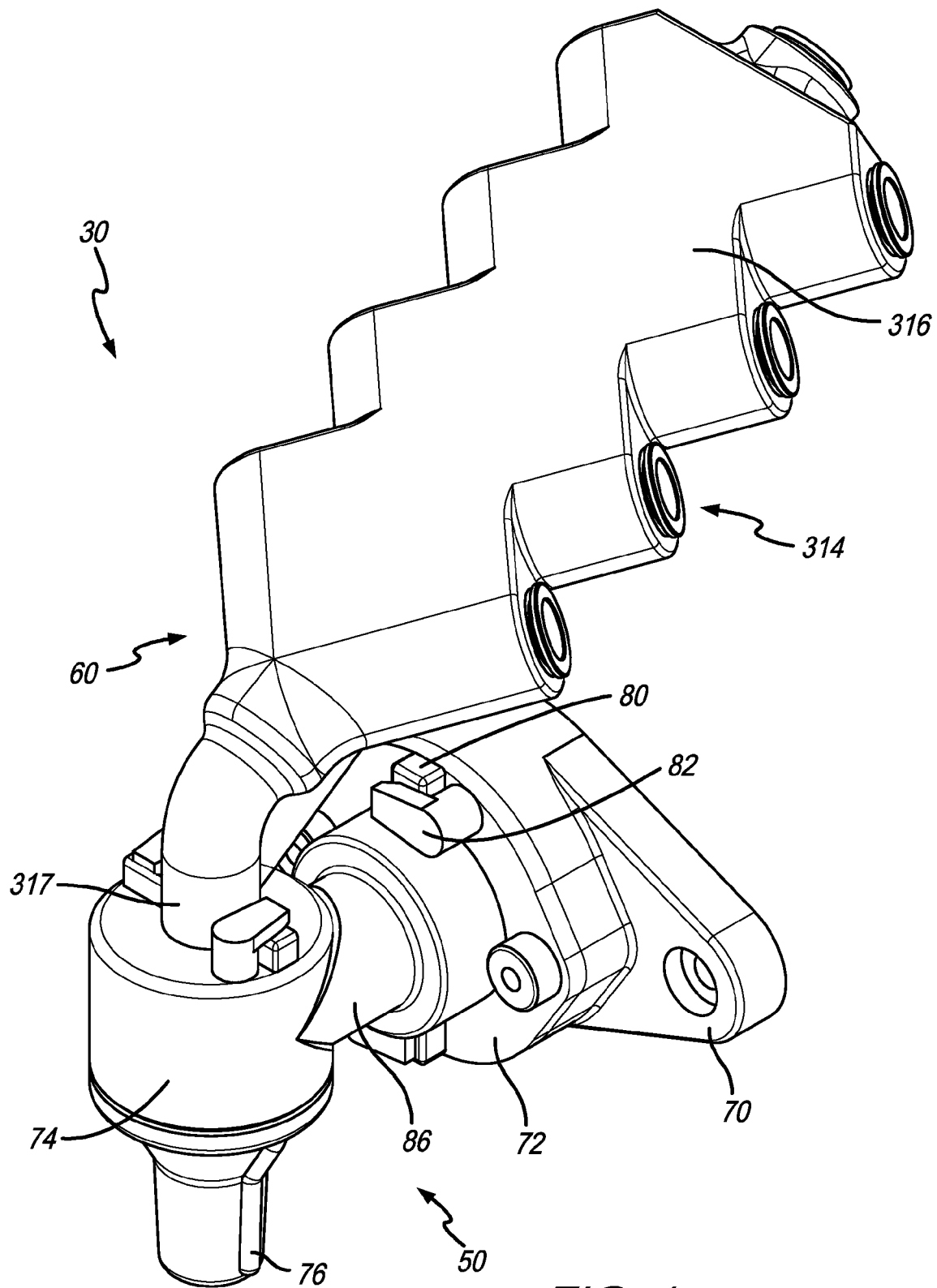
FIG. 1 is a prospective view of the dispensing head assembly of the present disclosure, the dispensing head assembly includes the milk dispensing component and the flavor dispensing component, which are configured for attachment to a system for controllably dispensing milk, steam, air, water, and flavorings.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof as presented in this document are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Terms including beverage, brewed, brewing, brewing substance, brewed liquid, and brewed beverage as may be used herein are intended to be broadly defined as including, but not limited to, the brewing of coffee, tea and any other beverages. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to including, but is not limited to beverage substances such as ground coffee, tea, liquid beverage concentrate, powdered beverage concentrate, flaked, granular, freeze dried or other forms of materials including liquid, gel, crystal or other forms of beverage or food materials to obtain a desired beverage or other food product.

Terms relating to ingredients such as milk, air, steam, water are to be broadly defined and interpreted to include these specific ingredients as well as other ingredients which could be used now or are used at some time in the future for such a dispensing system. For example, milk might include dairy-based milk products as well as soy or other "milk-type" products for use in beverages or other food stuff. While "steam" is referred to as a water produced steam, other ingredients might also be used to produce a "steam" including but not limited to flavored waters, tea, or other ingredients which might be used instead of water to produce a steamed produce. Similarly, while "water" is identified, water could be substituted for another ingredient or, for purposes of cleaning, water could be substituted with a suitable cleaning product to move that cleaning product throughout the system for cleaning and/or sanitizing the system.

While "coffee" such as espresso may be referred to herein as a beverage in which the milk and/or this beverage ingredient should be broadly interpreted. In other words, the "coffee" ingredient could be substituted with "tea" of any form whether leaf, herbs, botanicals or other sources. Additionally, the coffee may be in the form of fresh brewed coffee as well as coffee that may originate from any type of coffee or other beverage ingredient. Such ingredients including the characteristic or form of the beverage ingredients can be any variety of ingredients which are currently known or hereafter developed. Reference to this term "coffee" is understood to be broadly interpreted regardless of the nature or source of this ingredient. The form of the beverage ingredient may include powder, liquid, gel, crystal, flake, freeze-dried, and any other form or state regardless of the temperature, phase, or other characteristics which are currently known or hereafter developed. Reference to beverage dispensing includes reconstituting, brewing, steeping, or any other form of combining or creating a beverage ingredient.

The foregoing terms as well as other terms should be broadly interpreted throughout this application to include all known as well as all hereafter discovered versions, equivalents, variations and other forms of the abovementioned terms as well as other terms. The present disclosure is intended to be broadly interpreted and not limited.

Figure 14:
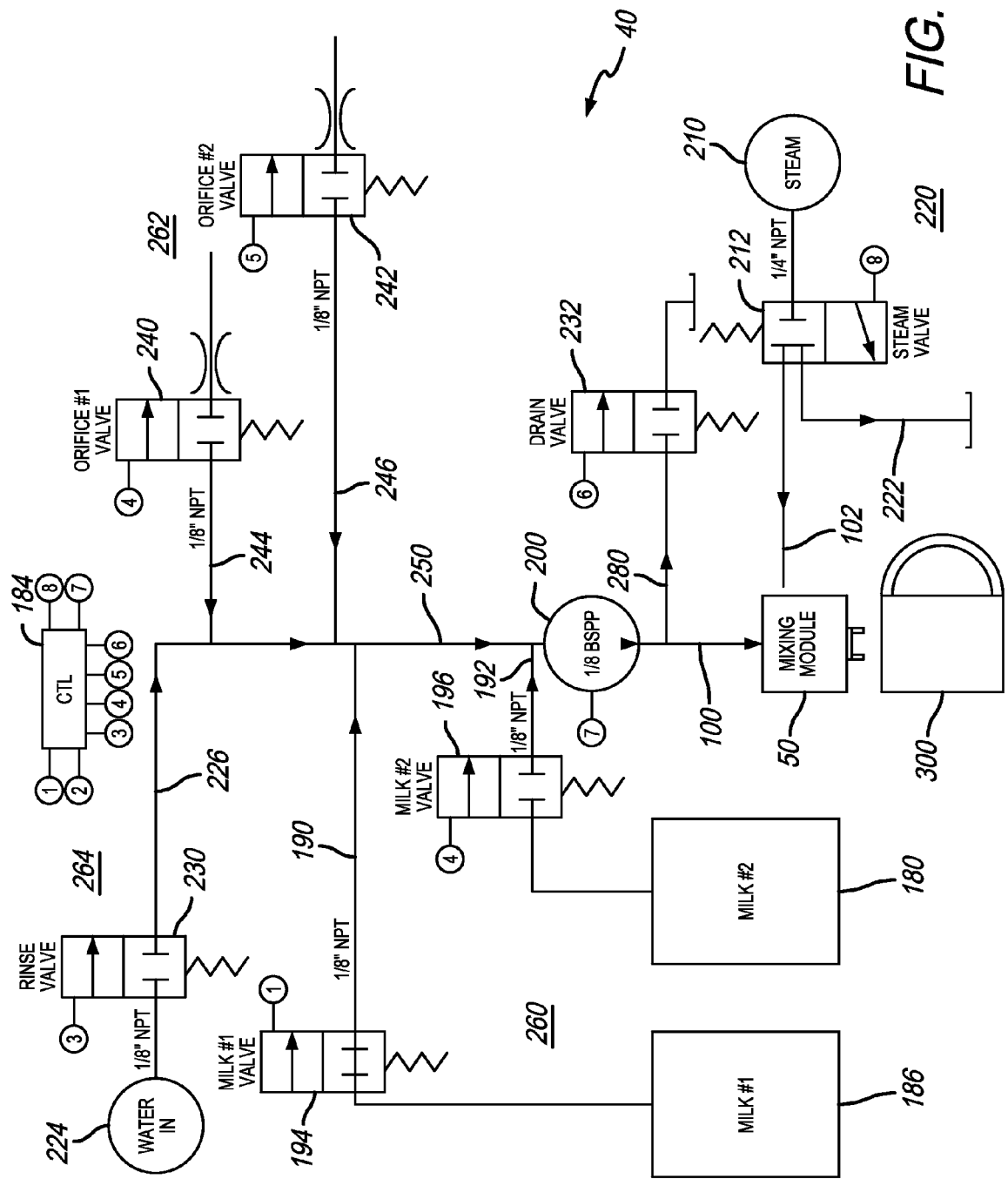
FIG. 14 is a general schematic diagram illustrating the components of the milk dispensing portion of the system including controllable valves relating to water dispensing, milk dispensing, air introduction, drainage, and steam introduction, as well as a pump and a controller coupled to each of the valves and pump.

With reference to the figures, FIG. 1 shows a dispensing assembly 30 which is attachable to a dispensing system 40 (see FIG. 14). The dispensing assembly 30 includes a milk dispensing component 50 and a flavored dispensing component 60. It should be noted that the milk dispensing component 50 can operate independently of the flavored dispensing component 60 as will be discussed in greater detail below.

Figure 2:
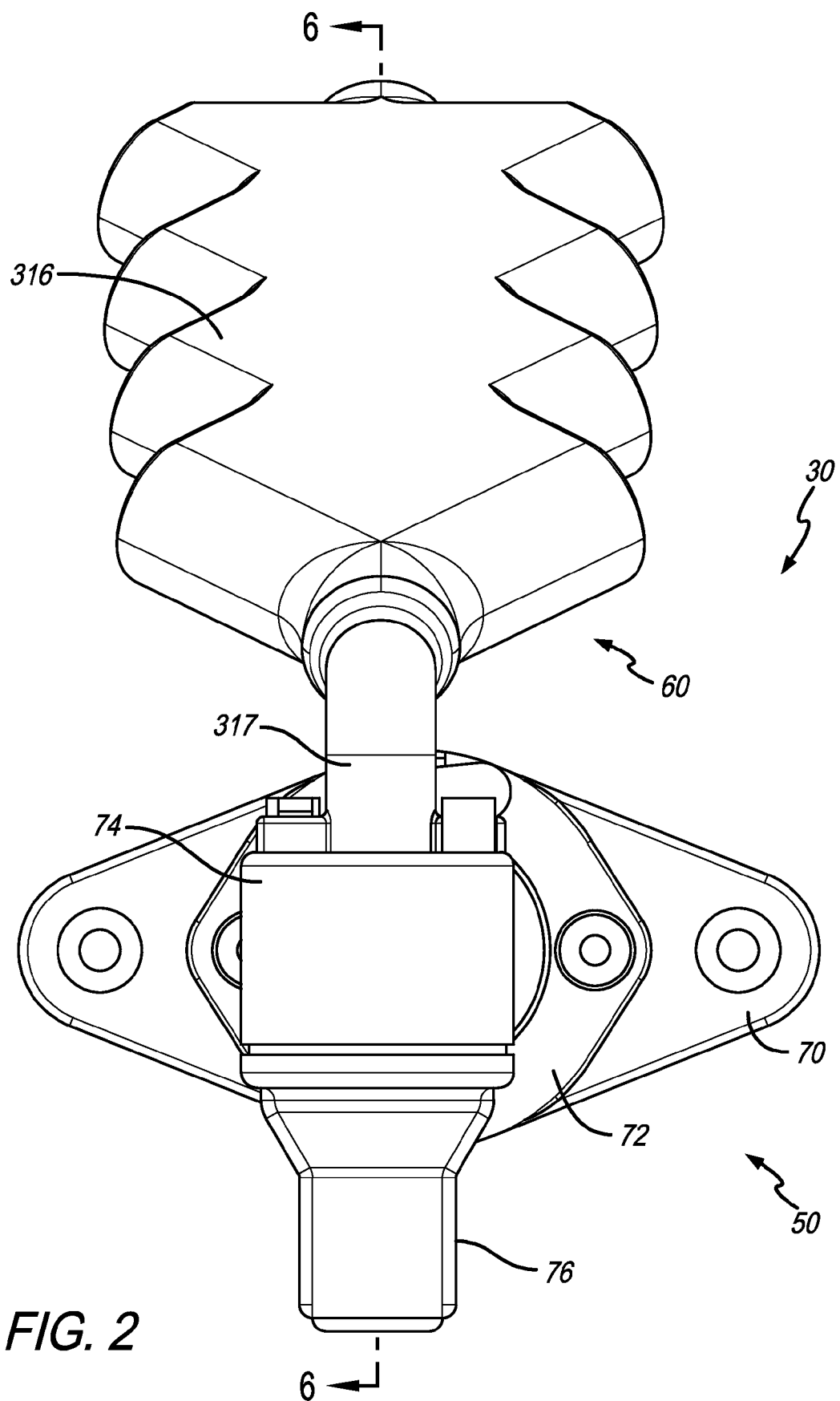
FIG. 2 is a front elevational view of the dispensing head assembly as shown in FIG. 1.
Figure 3:
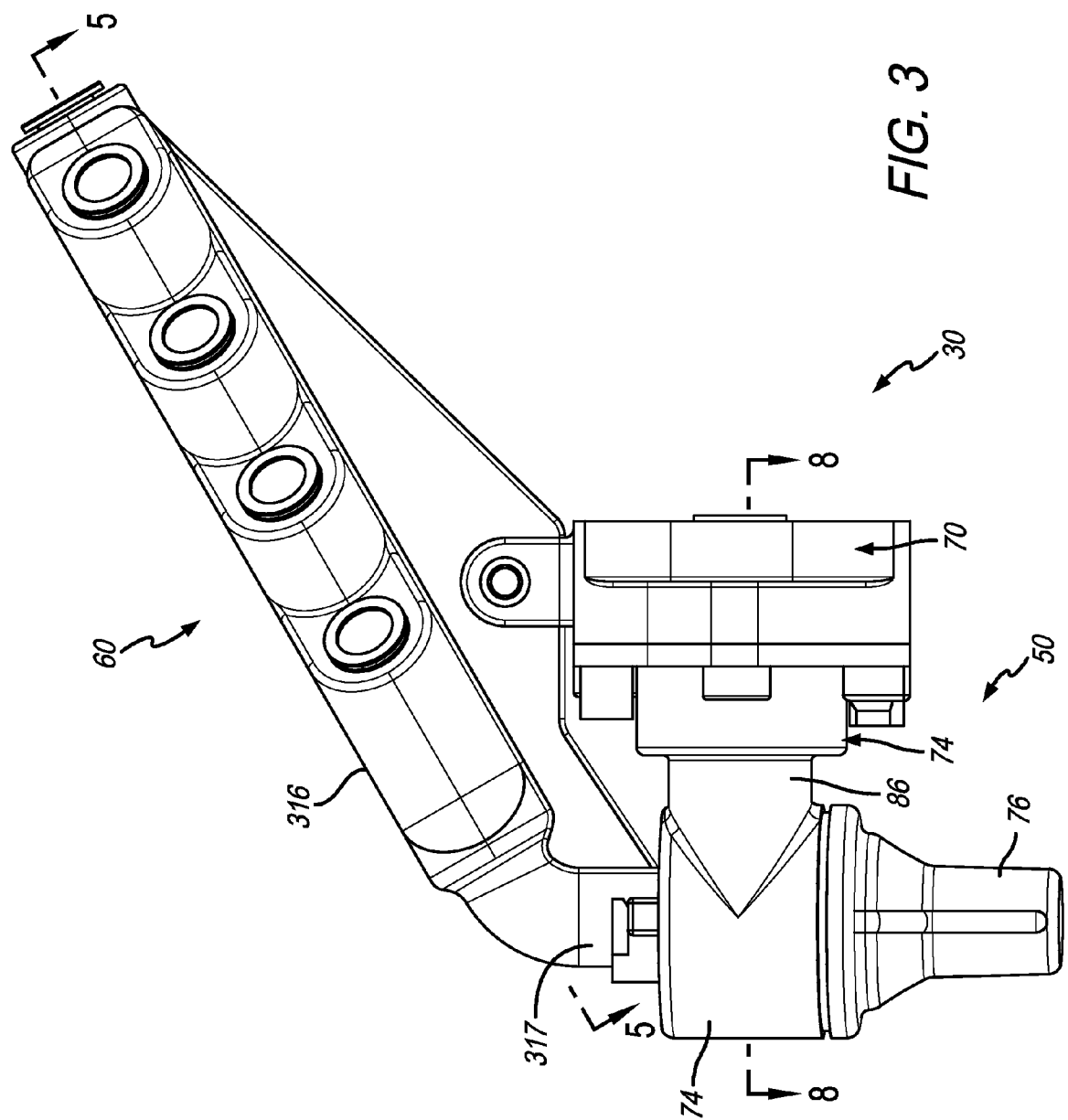
FIG. 3 is a right side elevational view of the dispensing head assembly as shown in FIG. 1.
Figure 4:
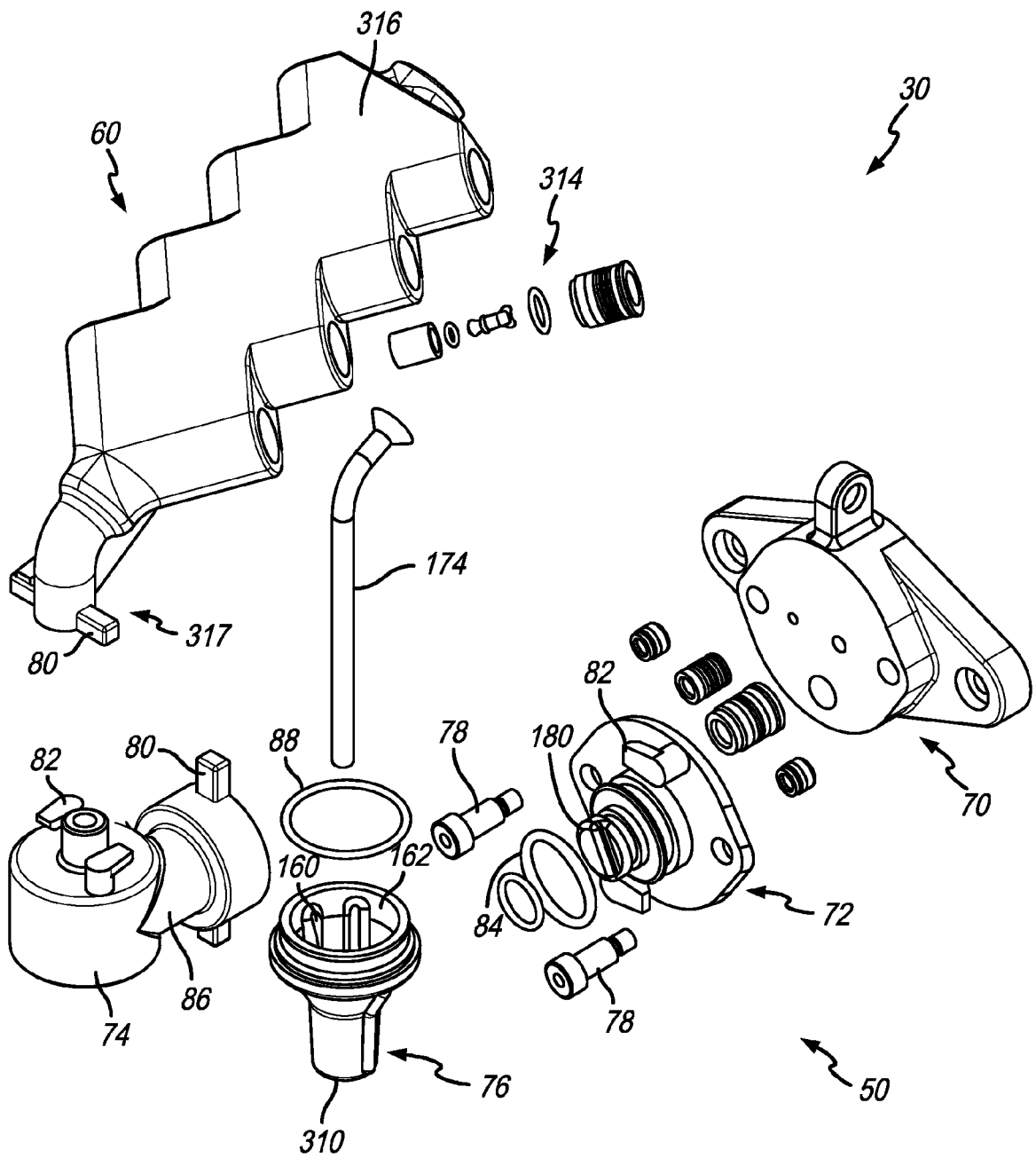
FIG. 4 is an exploded perspective view of the dispensing head assembly as shown in FIGS. 1-3.
Figure 5:
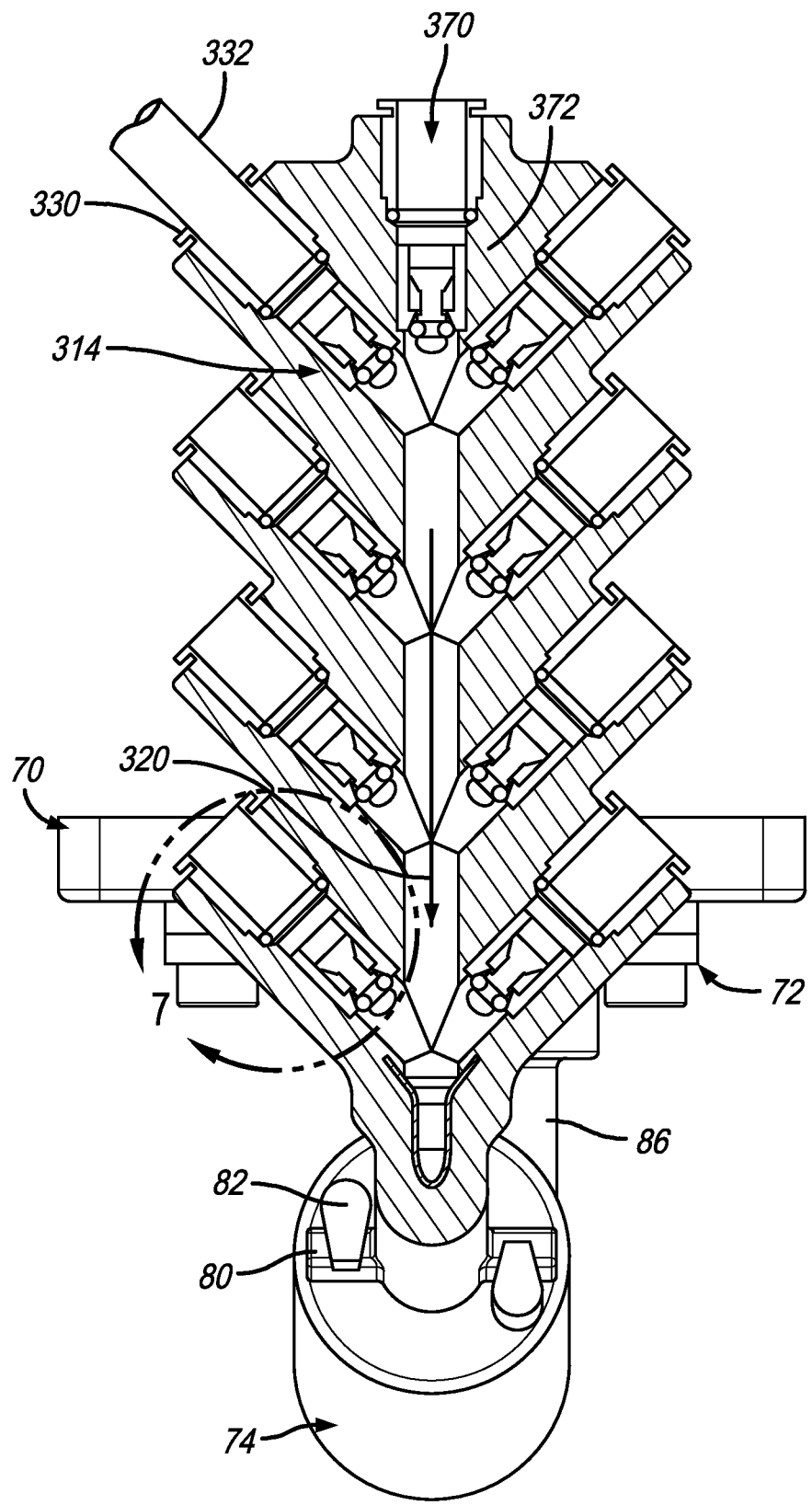
FIG. 5 is a partial fragmentary cross sectional view taken along line 5-5 in FIG. 3 showing a manifold portion of the flavor dispensing component.
Figure 6:
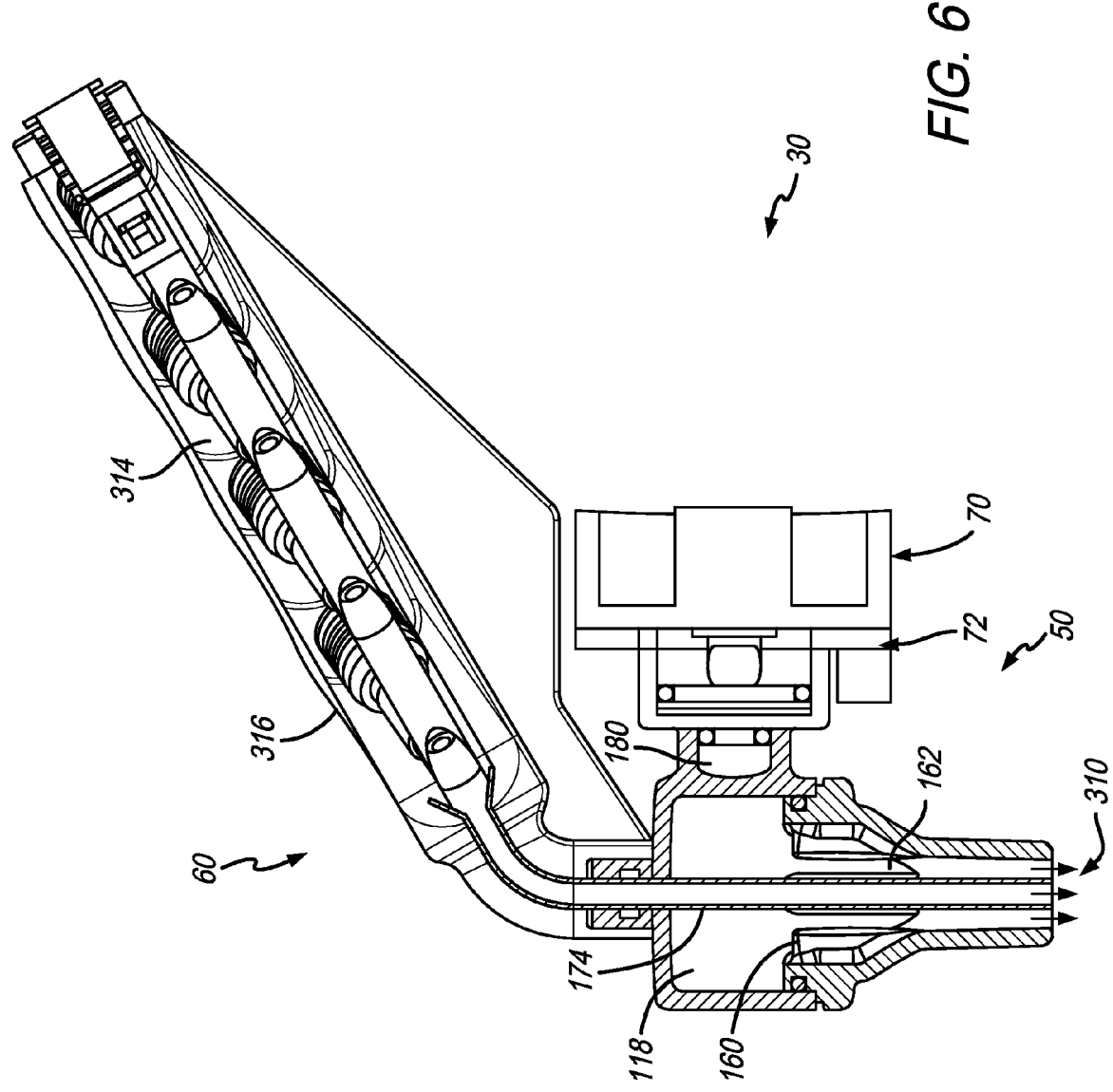
FIG. 6 is a cross sectional view taken along line 6-6 of FIG. 2 showing a cross sectional view through the manifold as well as the milk dispensing component.
Figure 7:
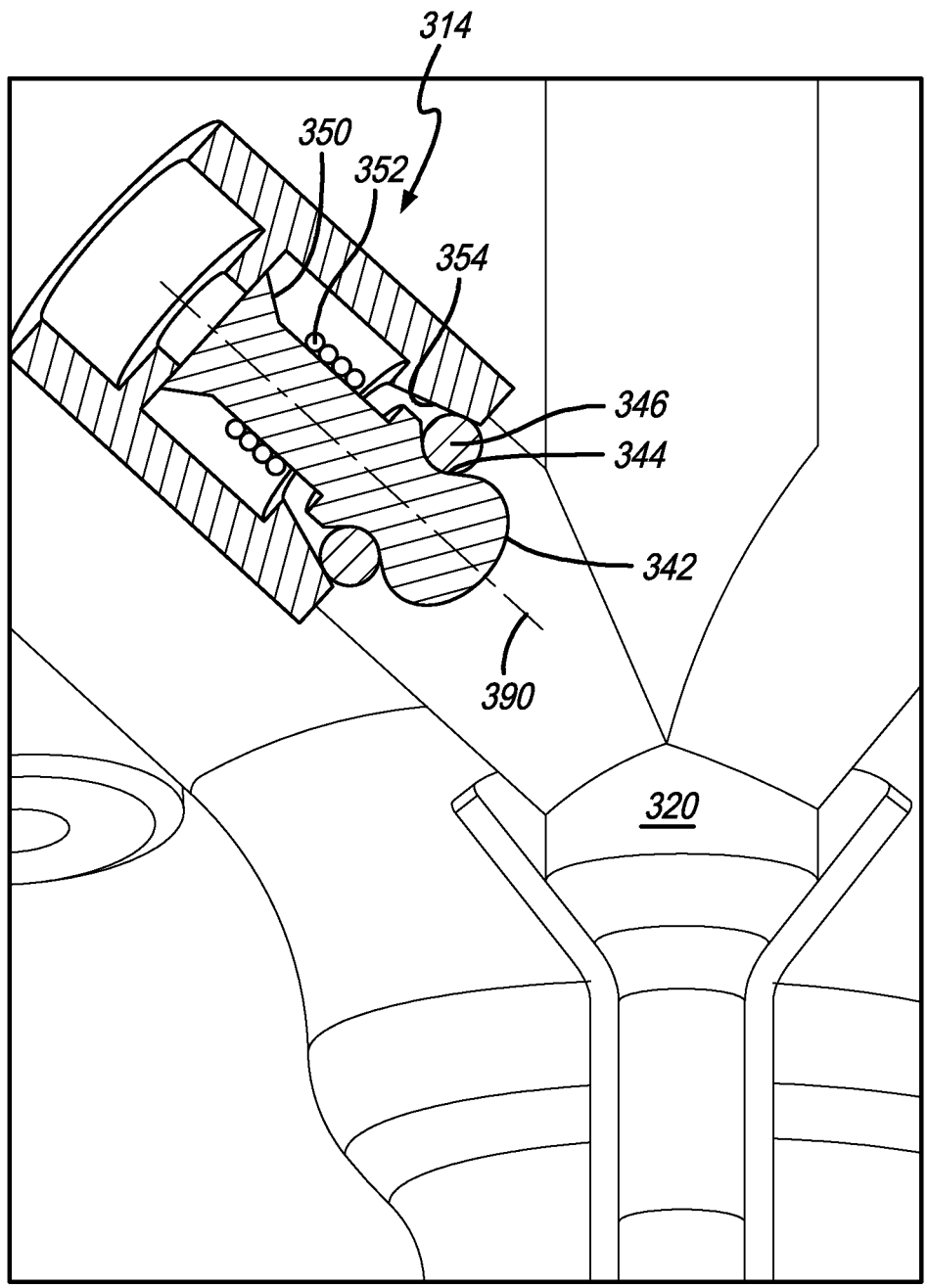
FIG. 7 is an enlarged view of a flavoring inlet assembly.

FIGS. 2 and 3 show a front and right side elevational view, respectively, of the dispensing assembly 30. Features discussed herein can be further identified and clarified with reference to these additional figures. The exploded perspective view of FIG. 4 provides additional identification and relationship of the various components of the dispensing assembly 30. The milk dispensing component or system 50 includes several subassemblies including a mounting base 70, a dual milk/steam component 72, a swirl chamber 74 and an output nozzle 76. The dual milk/steam component 72 attaches to the mounting base 70 by means of the fasteners 78. Gasketing or other sealing technology is provided between the dual component 72 and the mounting base 70. The swirl chamber 74 includes a pair of lugs 80 which provide a quick engagement fit with retainers 82 provided on the dual component 72. Gasketing 84 is provided between the swirl chamber neck 86. The output nozzle 76 is gasketed 88 to a corresponding portion of the swirl chamber 74.

Figure 8:
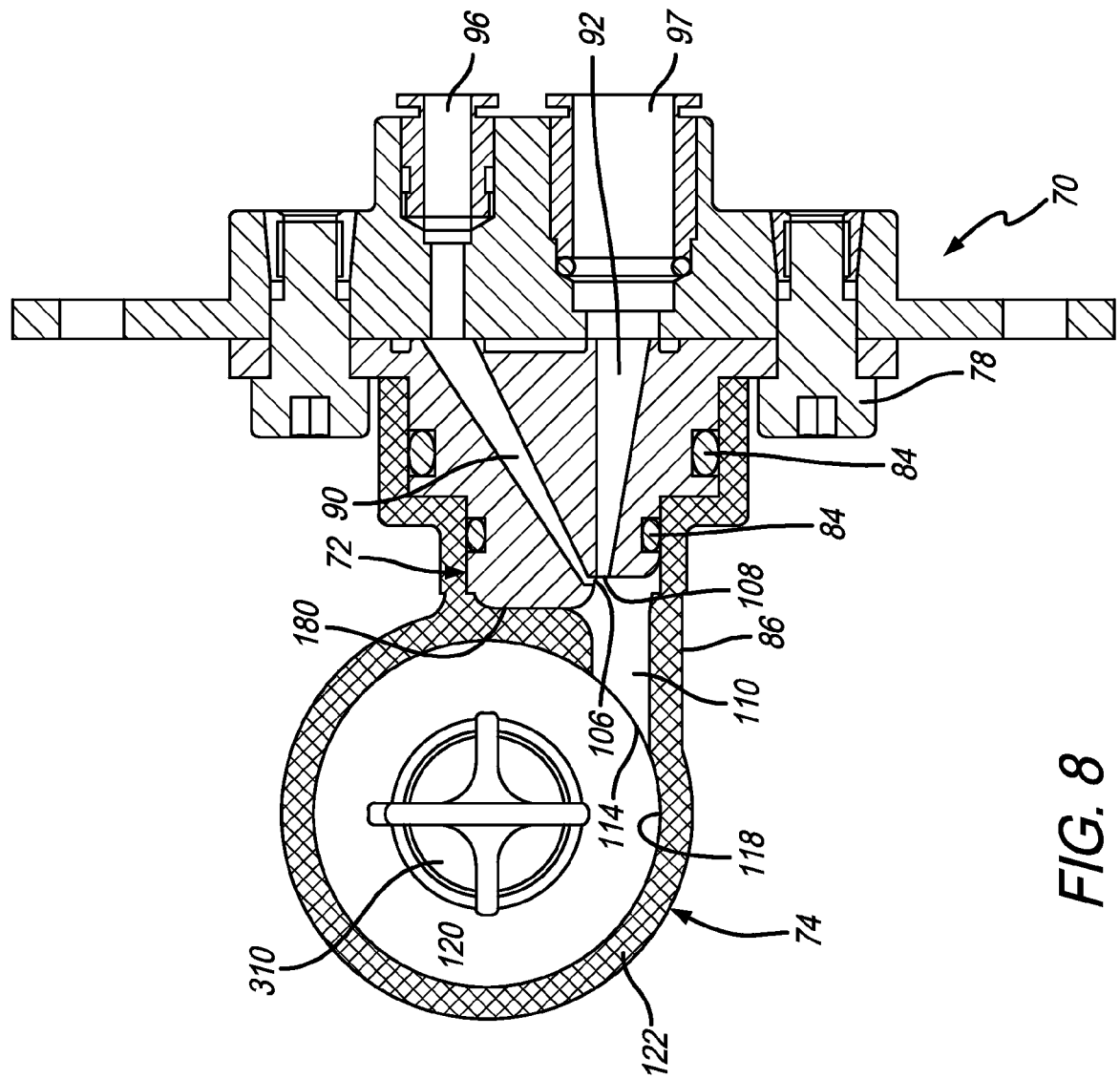
FIG. 8 is a cross sectional view taken along line 8-8 in FIG. 3 showing a cross section of the milk dispensing component including a milk line and orifice positioned approximate to a steam line and orifice combining in a mixing passage for generally tangential entry into a generally circular cylindrical chamber defined by at least one wall of the swirl chamber for developing hot steamed milk, hot frothed milk, and cold frothed milk as selected by the user or the beverage dispensed showing at least one version of a laminating structure within the swirl chamber.

In the cross sectional view of FIG. 8, the assembled milk dispensing component 50 is shown along with the relationship with the various components as described. The dual milk/steam component 72 includes the steam passage 92 and the milk passage 90. The milk passage 90 extends from a milk fitting 96 and the steam passage 92 extends from a steam fitting 97. These passages 92, 90 are coupled to a milk line 100 and steam line 102, respectively (see FIG. 14). The passages 92, 90 terminate in a steam orifice 108 and a milk orifice 106, respectively. These orifices 108, 106 communicate with an intermediate passage 110 which introduces the combined steam and milk, with or without air entrained in the milk, or under some circumstances milk alone, to the swirl chamber 74. The intermediate passage includes a generally circular cross section which terminates in a circular port 114 which introduces the stream of preliminarily mixed ingredients flowing from the mixing passage 110 generally along a tangent path relative to an inside surface 118 of the cavity 120 defined by a wall 122 of the swirl chamber 74. As will be discussed in greater detail, the steam and milk orifices 108, 106 have been tuned to achieve a desired set of characteristics of the resultant milk product.

Figure 9:
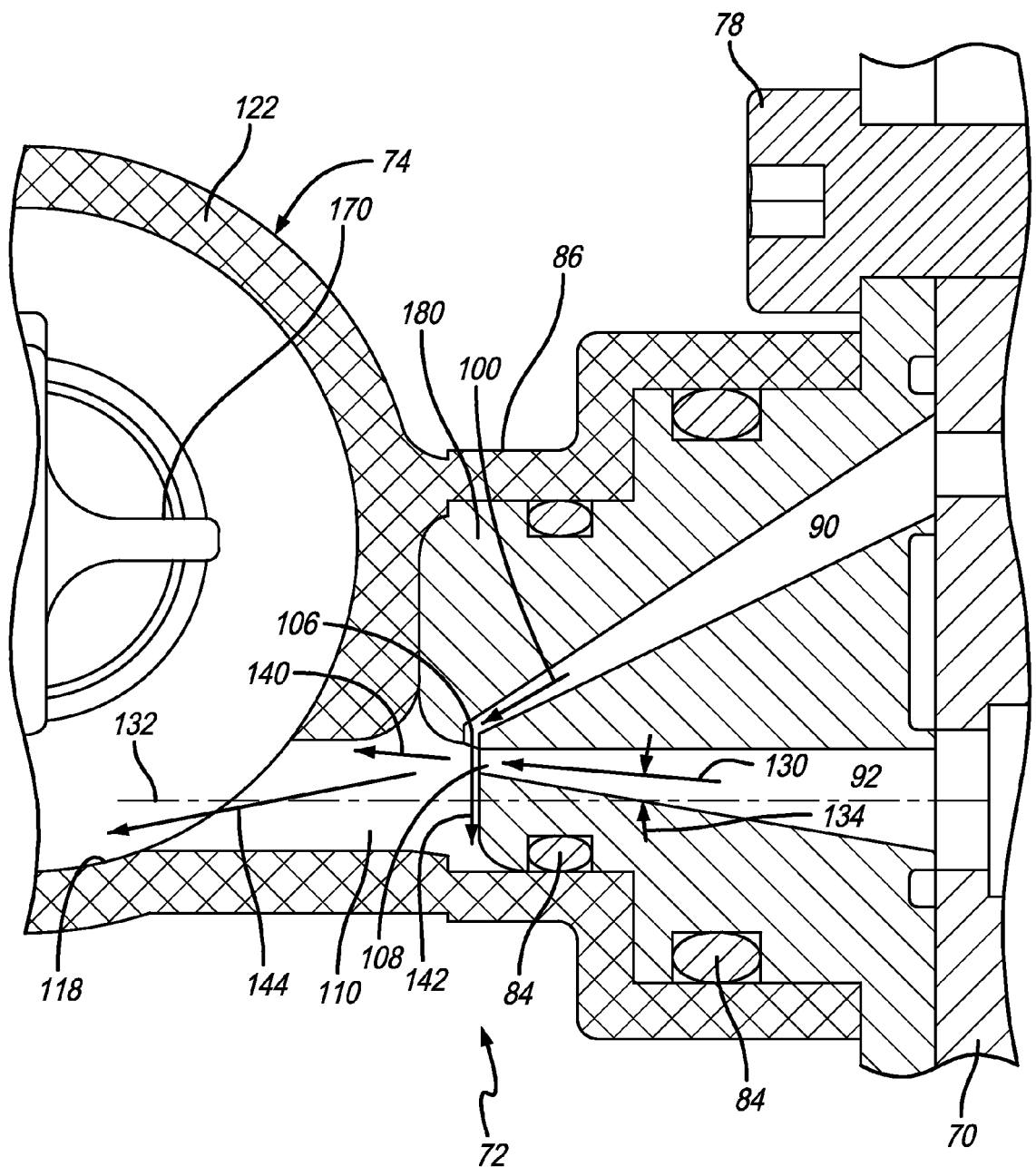
FIG. 9 is an enlarged view of the cross section as shown in FIG. 8 to further illustrate the directional paths of the milk line and steam line and the general directional paths of these components forming a generally tangential introduction into the generally cylindrical swirl chamber passing through a generally cross sectionally circular orifice positioned between the mixing passage and swirl chamber.
Figure 10:
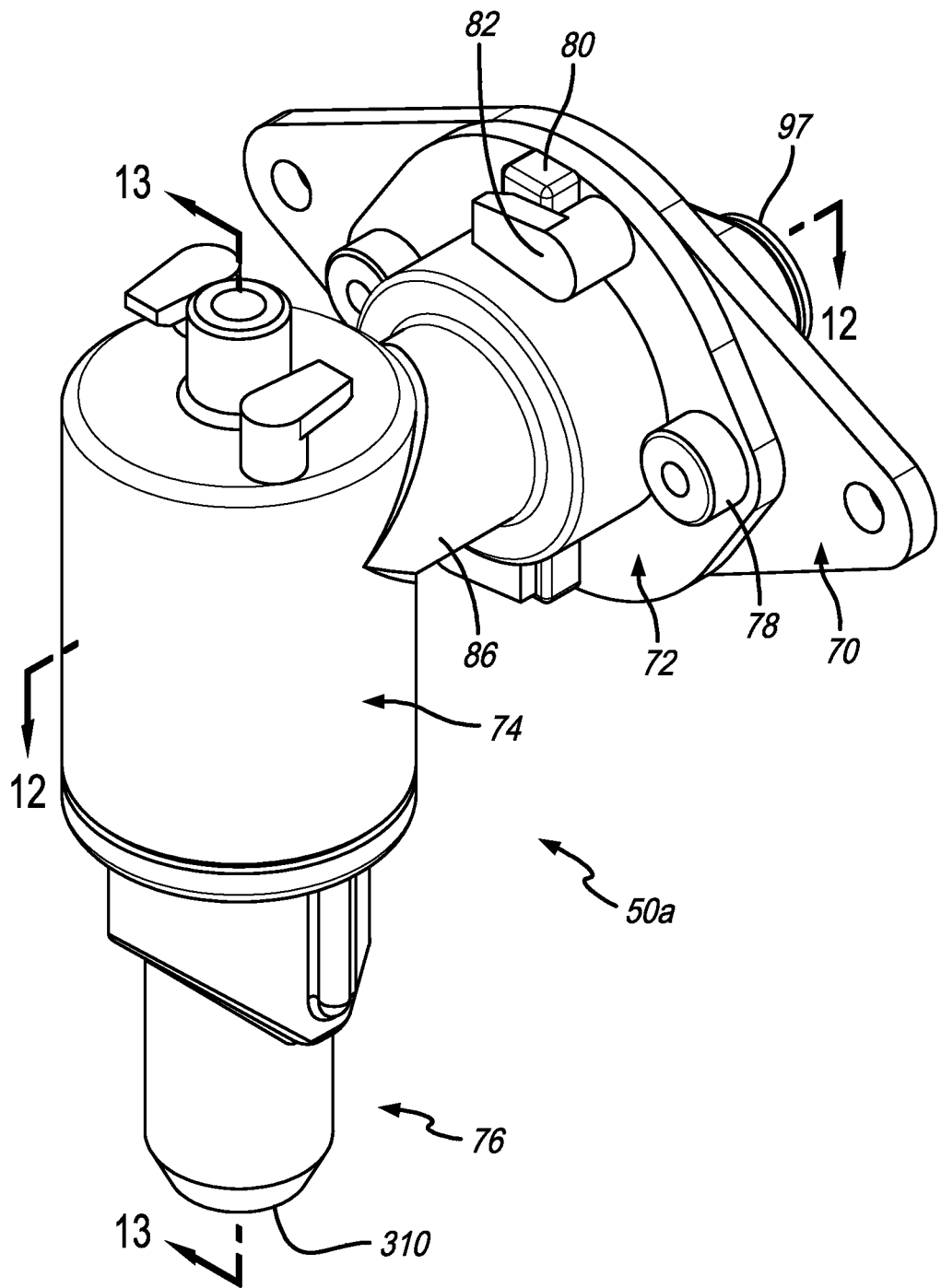
FIG. 10 is a prospective view of another embodiment of the milk dispensing component.
Figure 11:
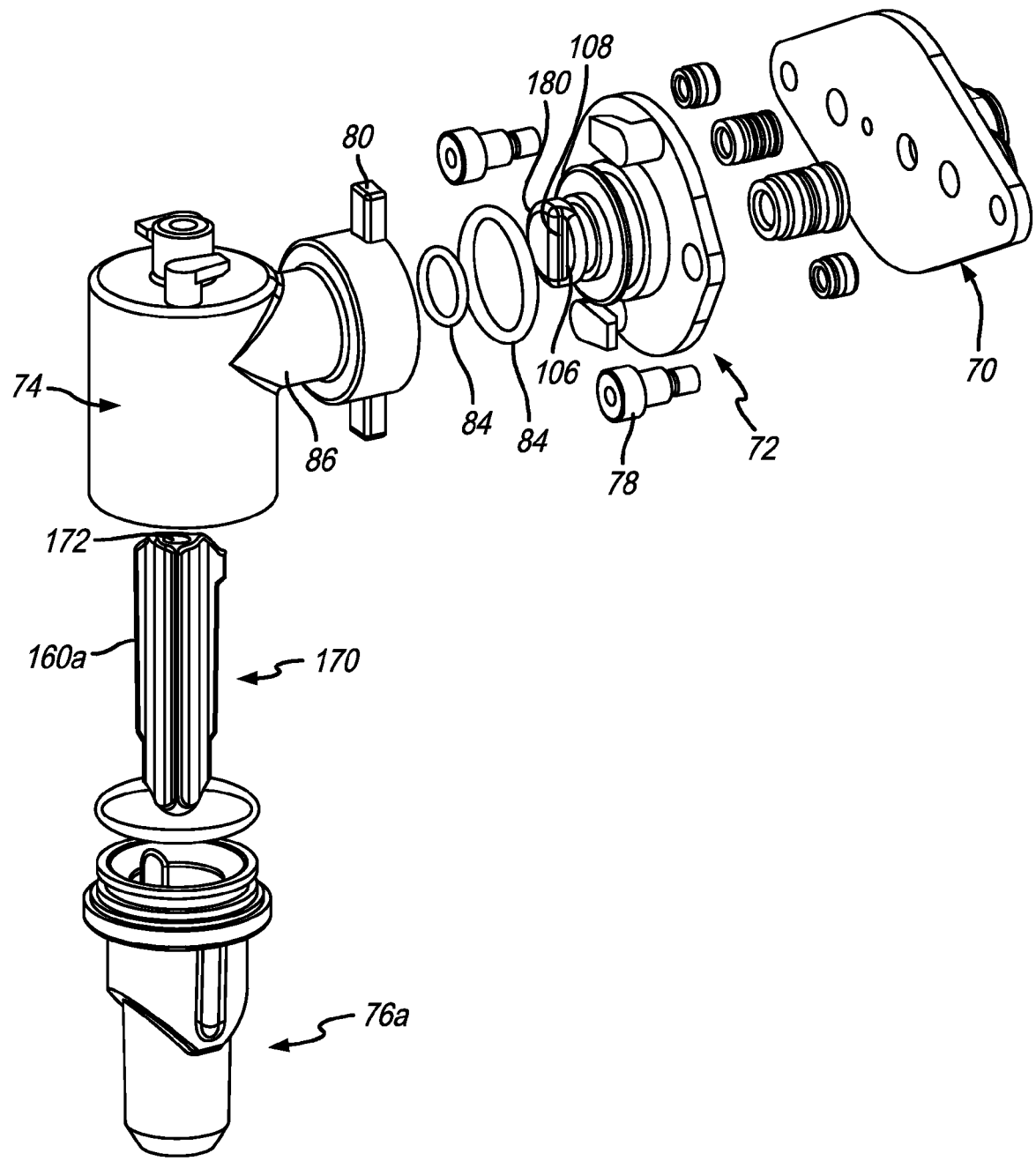
FIG. 11 is an exploded perspective view of the milk dispensing component as shown in FIG. 10 having a laminating structure which axially extends through a nozzle component, the components of the milk dispensing component being generally engageable and releasable by use of quick release lugs and retainers, fasteners and press-fit components.
Figure 12:
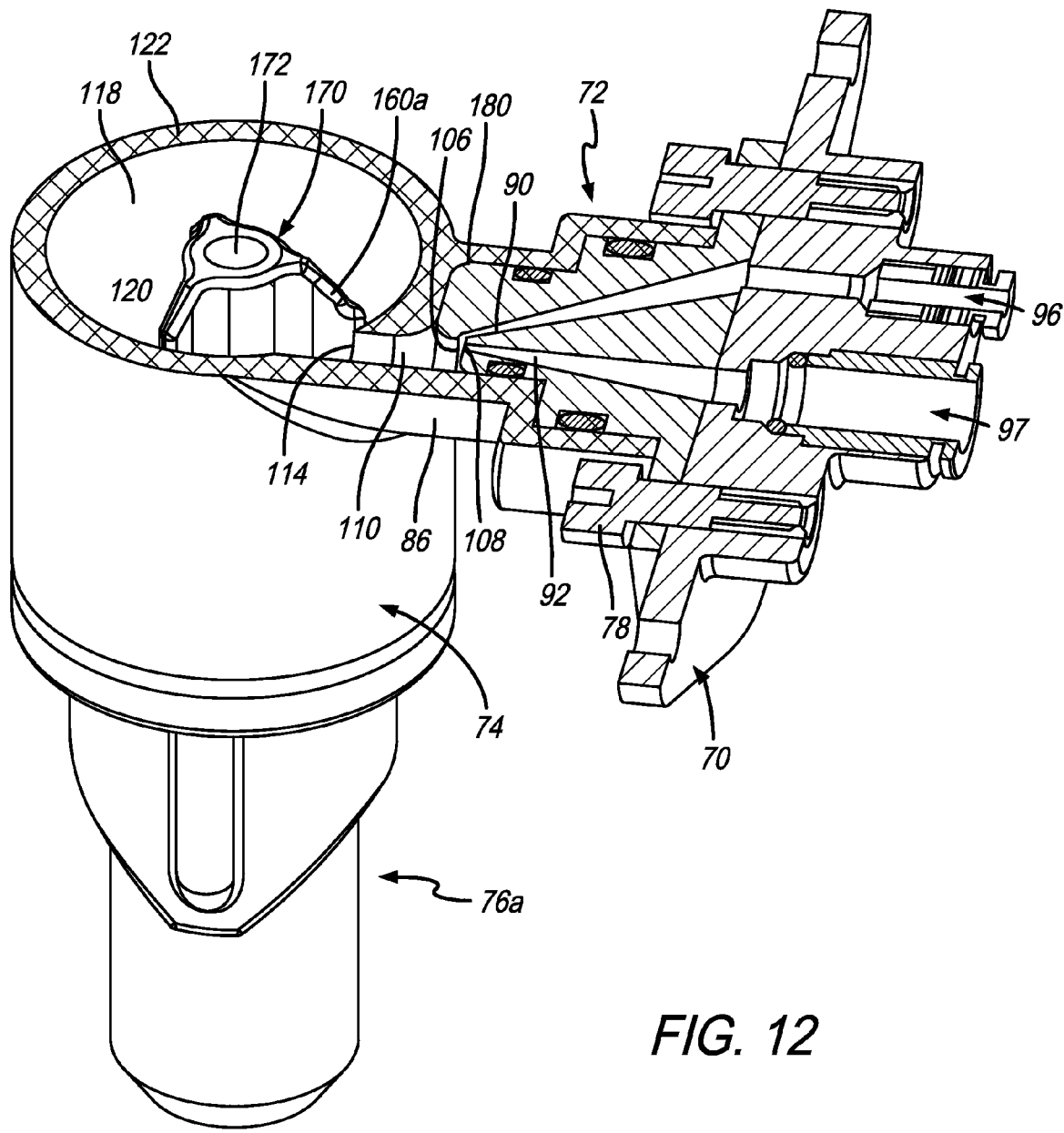
FIG. 12 is a cross sectional perspective view taken along line 12-12 in FIG. 10 showing the configuration of the laminating structure in the generally cylindrical chamber relative to the tangential entry of the milk and steam ingredients.
Figure 13:
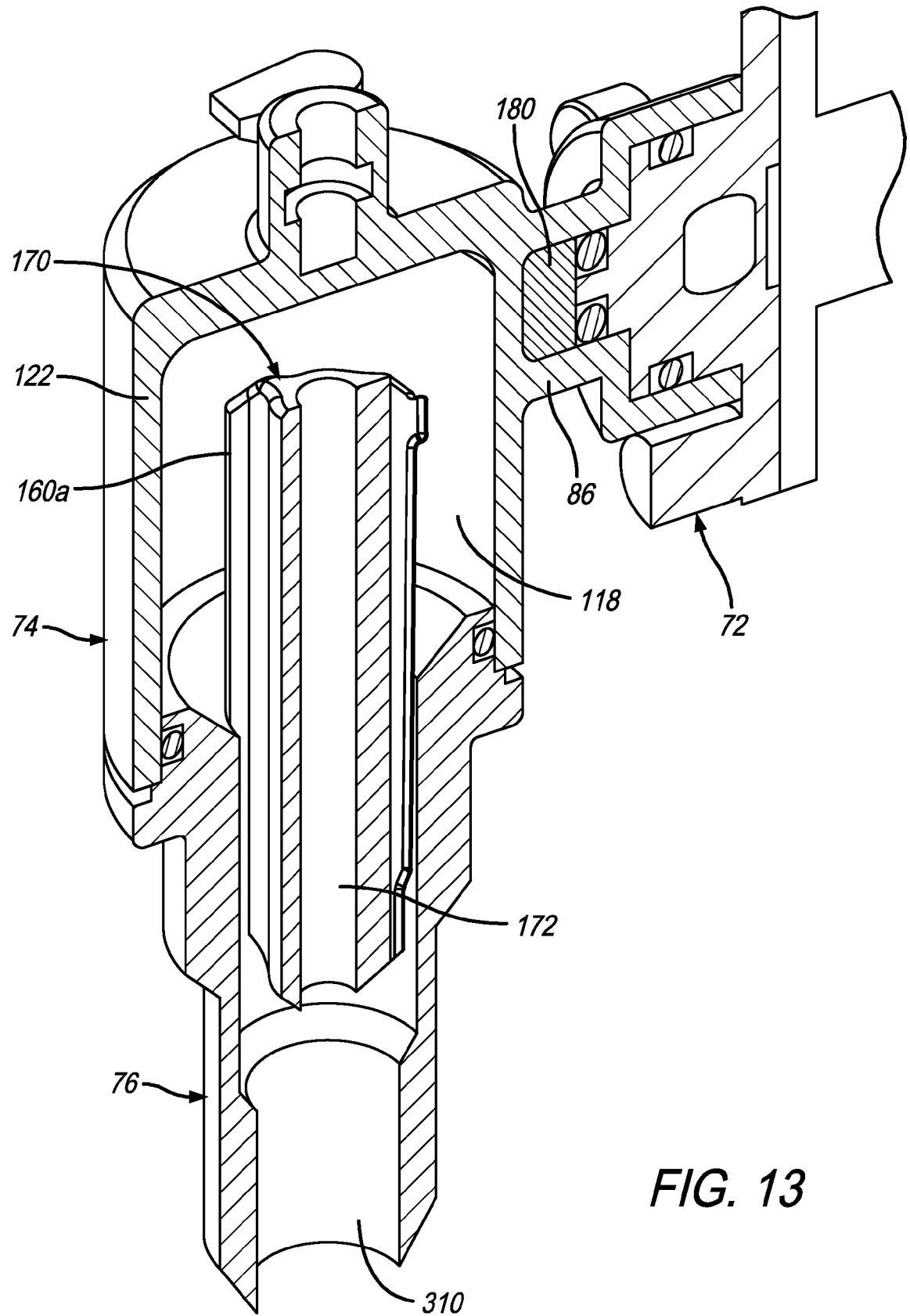
FIG. 13 is a cross sectional view taken along line 13-13 in FIG. 10 showing the axial relation of the laminating component, being removably retained in the swirl chamber and relative to the nozzle, further including a central bore there through for receiving a flavor tube for introducing flavoring ingredients downstream of the formation of the milk product.

With further reference to the enlarged view of the orifices 108, 106 and the intermediate passage 110 as shown in FIG. 9, the structures and functions of the milk dispensing component 50 will be further described. Additionally, it should be noted that the system can accommodate milk, air, and steam ingredients to produce a variety of predetermined steamed, frothed, or untreated milk characteristics. For example, a combination of milk, air, and steam can be controllably combined to produce a form of hot milk having frothy or foamy characteristics. The controllable introduction or entraining of air into the milk prior to mixing with the steam provides additional loft and formation of bubbles in the milk. A controlled combination of milk and steam with no added air can be used to produce hot steamed milk having less frothy or foamy characteristics. Cold milk, or ambient milk can be used to produce either a cold milk product or, with the addition of some amount of air, a cold milk product having frothy or foamy characteristics. The specific details and combinations of these ingredients will be described in greater detail below.

Returning to FIG. 9, the steam passage 92 communicates with the mixing passage 110 along a center line 130 which is offset from a center line 132 of the mixing passage 110 by an angle 134. The steam line 92 communicates through the steam orifice 108 with the mixing chamber 110. The steam orifice is positioned in close proximity to the milk orifice 106. Generally, the steam orifice impinges on the milk stream 142 exiting the milk path 90 at an angle which is approximately 90° or greater. The impingement of the steam flow 140 on the milk flow 142 creates a vector flow of the combined steam and milk 144 which generally introduces the flow 144 at a tangent relative to the inside surface 118 of the swirl chamber 74. As will be described in greater detail with regard to the system of FIG. 14, the milk 90 and steam 92 paths and flows can be adjusted or tuned to provide a desired or predetermined result. The impingement of the steam on the milk at a significant angle creates a shearing effect which creates a thorough combination of heat energy with the milk product. As mentioned, air can be introduced into the milk stream 100 to further enhance the frothing characteristics of the milk.

While a variety of orifice shapes and dimensions can be used for the orifices 106, 108, it has been found that a pair of generally rectangular shaped orifices having a height dimension of approximately 0.65" and a width dimension of approximately 0.025" is preferred. A range of dimensions can be used and are fully anticipated to be within the scope of the present disclosure. However, for the current embodiment described these dimensions and the generally rectangular shape have desirable performance characteristics. The orifices produce results in which there is a thorough combination of the heat energy with the milk and a cohesive froth formed during the combining or shearing process. In other words, the steam emitted form the steam orifice interacts with the milk stream 100 to continuously shear the milk stream 100 to thoroughly combine the steam components (energy, velocity, mechanical agitation) with the milk. The orifices then to create what approximates fluid streams or blades that interact. Further, introduction of the combined stream 144 and milk generally at a tangent to the circular cross section swirling chamber tends to retain the heat energy and the froth characteristics and allow continued mixing as the froth swirls around the swirl chamber before decelerating and draining through the nozzle during the dispensing cycle. Prior frothing devices tended to degrade the quality of the froth depending on how the froth was introduced into a dispensing nozzle or chamber.

With reference to the figures, FIG. 4 shows a series of laminating ribs 160 which are formed on an inside surface 162 of the output nozzle 76. The laminating ribs 160 help to take the generally swirling or rotary flow of the mixed ingredients 144 in the swirl chamber 74 and direct it downwardly through the nozzle 76 for dispensing in the cup.

Another form of the milk dispensing component 50a is shown in FIGS. 10-13. This version of the milk dispensing component is substantially the same as that shown in FIGS. 1-9. One difference is the use of a removable laminator structure 170. As shown in the FIGS. 10-13, the laminator structure is keyed to fit in the throat of the nozzle 76a. In this embodiment the nozzle does not include the laminating ribs 160 as shown in FIG. 4 which are instead substituted by similar ribs 160a on the outside surface of the laminating structure 170. As will be described in greater detail with reference to the flavor dispensing assembly 60, an axial bore 172 is provided along the axial length of the laminator structure 170 to accommodate a flavor dispensing tube 174 of the flavor dispensing component 60.

Additional benefits of the milk dispensing component 50 of the present disclosure are that it is relatively easy to manufacture and relatively easy to assemble and disassemble. Ease of manufacturing helps to reduce costs of the parts and maintain repeatability and tolerances. For example, each of the components can be molded from a plastic material and help maintain the tolerances which are important to produce the desired and consistent milk products. Further, the generally tool-less assembly and disassembly helps to promote disassembly for cleaning and sanitizing as well as accurate and reliable reassembly. In this regard, the milk dispensing component 50 can be disassembled by disengaging the lug and retainer connection between the swirl chamber to remove it from the dual milk/steam component 72. This allows the operator to clean the head 180 which includes the orifices 106, 108. The gaskets 84 can be retained on the dual component 72 or removed for cleaning. Once the swirl chamber 72 and attached nozzle 76 are removed from the dual component 72, they too, can be disassembled for cleaning. These components can be deposited in a dishwasher or sanitizer for cleaning. Similarly, in the embodiment of FIGS. 10-13, the laminating structure 170 can be removed from the throat of the nozzle 76a for cleaning or sanitizing.

Turning to FIG. 14, the system will be discussed in greater detail. Up to this point the mixing component 50 has been generally described with regard to the associated structures and functions, and is shown on the illustration of FIG. 14. The control and operation of the system 40 is important to achieve the desired dispensing results.

The system 40 includes a series of components which are coupled to and controllable by a controller 184. As shown in the illustration, the controller includes a series of nodes which are numbered and correspond to lines associated with the various components on the diagram. It should be understood that these lines will be directly coupled to the controller either through wired, optical, or wireless connections. The nodes are shown merely to provide clarity in the description of the present disclosure.

The system 14 starts with the use of milk ingredients shown as milk #1 186 and milk #2 188. As earlier described, these milk ingredients can be any number of milk or food ingredients which may be used in this type of dispensing device and system. The reference to the ingredient term "milk" is to be broadly interpreted. The milk ingredients 186, 188 are coupled to the milk line 100 via connecting lines 190, 192, respectively. Control valves 194, 196 communicate with the corresponding lines 190, 192 to control the flow of milk from the refrigerated milk sources 196, 188. An adjustable speed pump 200 is provided on the milk line 100 to controllably pull milk from the refrigerated sources when the corresponding valves 194, 196 are actuated by the controller 184 to open the passage on the corresponding line 190, 192.

A steam source 210 is coupled to the steam line 102 for mixing with the milk at the mixing component 50. A controllable steam valve 212 is coupled to the controller 184 to controllably dispense steam through the steam line 102 for mixing with the milk ingredient. The steam source may be any type of known or hereafter developed steam generator which combines water, or some other ingredient to be broadly interpreted, with heat to increase the energy of the ingredient. Steam is generated to help deliver heat energy to the milk ingredient under pressure to produce the desired milk heating results. The steam portion 220 of the system 40 also includes a drain 222 to drain any excess steam, condensate, or air through the controllable steam valve 212. It should be noted that the steam valve is normally closed and is actuated by the controller 184 to the open position or the drain position.

The system also includes a water source 224 coupled by line 226 to the main line 250. When the milk valves 194 and 196 are closed the pump 200 can be used to draw water from the water source 224 when a corresponding water valve 230 is actuated to the open position by the controller 184. The water line is used for a rinse cycle which will be described in greater detail below. The water source can be provided by means of a reservoir or a plumbed and pressurized water line. A drain valve 232 is provided in the system to drain rinse water from the milk line 100 when the valve 232, coupled to the controller 184 is actuated to the open position.

A pair of controllable air inlet orifices is shown as part of the dispensing system 40 on FIG. 14. The orifices include controllable air inlet valves 240, 242 which are coupled via lines 244, 246, respectively, to the common line 250 which couples to the milk line 100 upstream of the pump 200. The air inlet orifices may be equally sized to independently controllably provide equal air flow or may be of different sizes to provide different volumes and/or rates of air flow. Regardless of the sizes, the controller 184 can operate the corresponding valves 240, 242 which are normally closed, to the open position to allow air into the main line 250 for mixing with the milk ingredients. The use of multiple air inlets allows for controlled increase or decrease of flow to produce predetermined results and enhance the controllability of the system.

The operation of these multiple air inlet valves 240, 242 will be described in greater detail below.

As an overview, the system 40 includes the steam portion 222, the milk portion 260, the air inlet portion 262 and the water or rinse portion 264. Each of these portions can be controllably operated by the controller 184 to produce the desired milk dispensing including heating and/or frothing as desired. The result is dispensed into the milk dispensing component 50 for mixing with a coffee, espresso, tea or other beverage ingredient. Further details regarding the dispensing of flavoring will be described below.

In use, each of the primary milk products which can be produced by the system will be described in detail with regard to the structures, system and functions. With regard to hot frothed milk products the system 40 is operated by actuating the pump 200 at an adjustable speed to draw milk from at least one of the corresponding milk sources 186, 188. While the speed of the pump is set to a default for producing hot frothed milk other speeds can be selected depending on the desired results, operating conditions, milk viscosity, temperature, altitude and other variables. The ability to adjust the speed allows for flexible control of this system for use in dispensing hot frothed milk. Once the milk is selected and the pump is actuated the corresponding milk valve will be operated by the controller 184. Also, a corresponding air inlet orifice will be actuated. In this regard, either one of the orifices or the smaller of the orifices will be actuated. As milk is drawn through the mainline 250 with the air by the pump 200 it will approach the line 280 coupled to the drain valve 232. At an appropriate time the drain valve 232 is actuated closed by the controller 184. The drain valve is normally open and is controllably actuated closed. This allows for diversion of ingredients remaining in the system prior to the dispense cycle to drain through the drain until a desired dispensing cycle is selected.

The flow of milk through the main line 250 along with air will tend to push any accumulated condensate, residual drain water, or any other moisture through the line 280 and out through the drain valve 232. After appropriate period of time which is calculated to drain this material, the drain valve 232 is actuated closed. The closing of the drain valve causes the milk and air ingredients to continue to flow through the milk line 100 towards the milk dispensing component 50. After a very short delay (from 0 to 1 sec. in 0.1 second increments) the steam valve 212 is actuated by the controller 184 to the open position. Steam is dispensed through the steam line 102 for shearing impingement on the milk stream 100 as described earlier in this disclosure. The combined milk and steam along with the introduction of air into the milk stream 100 results in hot frothed milk. The milk valve, air valve, pump, and steam valve will remain activated by the controller 184 for a desired period of time calculated based on the portion size to be dispensed. It should be noted that an adjustable portion size can be selected and programmed into the controller 184 based on the dwell time or duration time the corresponding valves are maintained open.

When an appropriate amount of milk consistent with the selected portion size has been dispensed, the milk valve and air valve can be actuated off. Residual milk, air, and steam will bleed from the corresponding lines 100, 102 and drain into the corresponding container 300. After a wait time from 0 to some positive time increment has lapsed the drain valve can be deactivated to open it (it is normally open) and to open the passage 280 through the drain valve 232. The water portion 164 can be actuated including opening of the rinse valve 230 for dispensing water along line 226. This will allow rinsing of the main line 250 of any residual milk ingredients.

Additionally, at this rinse or cleaning stage the steam valve can be energized open. It should be noted that the steam valve should be energized some positive period of time after deenergizing the milk stream 100 so as to provide additional clearance of milk products from the milk dispensing component 50. This may result in a small stream of steam at the end of the milk dispensing cycle which is not inconsistent with the characteristics of dispensing milk, especially hot frothed milk, into a beverage.

The water valve is continued to be energized open for a period of time for a predetermined rinse cycle. At the conclusion of the predetermined rinse cycle, the rinse valve 230 is deenergized followed momentarily by deenergizing the pump 200 so as to help bleed off water from the water line 226 and main line 250. The drain valve 232 can remain open to allow drainage of any additional condensate, steam, or other fluids.

It should be noted that the combination of controllable portions including steam 220, air 262, and milk 260 can be controlled to provide a variety of milk products. Further, the water portion 264, pump 200, drain 232 and steam 220 can be operated to provide a variety of cleaning, sanitizing and other rinsing functions. With the present system 40 provides a high degree of controllability which can be programmed at the controller 184.

Hot steamed milk can also be produced by the system. The hot steamed milk operates in a similar manner as described above with regard to the hot frothed milk but generally without the introduction of air through one of more of the air inlet valves. For the hot steamed milk the pump can be operated at an adjustable speed of approximately 15% when at least one of the milk valves 194, 196 is actuated. The operation of one of the milk valves 194, 196, pump 200, and the water portion 264 over the various steps of the dispense cycle, including rinse, is similar to that as described above with regard to hot frothed milk. However, neither of the air inlet orifices and corresponding valves 240, 242 is actuated. Further, the adjustable speed of the pump 200 is used to help adjust the temperature of the milk. The speed of the pump helps control the volume of milk that is passed through the milk line 90 and therefore the volume of milk which interacts with the volume of steam. The result it that to some degree the temperature of the milk can be affected by the speed of the pump as the volume of milk is controlled by the pump speed.

Similar to that as described above with regard to hot frothed milk, the milk pump is operated for a period of time which is proportional to the volume or portion size to be dispensed. During the last portion of time (adjustable from 0 to 3 seconds) of milk dispensing when dispensing hot steamed milk, one of the air orifices is actuated open and the pump speed is increased. This helps to provide a small amount of froth milk on top of the steamed milk and to clear the milk line.

Continuing with hot steamed milk, the system can go through a rinsing cycle as indicated above with regard to hot frothed milk resulting in completion of the cycle, the cleaning of the lines, and preparation for the next milk dispensing cycle request. The system can also produce cold frothed milk. The cold frothing process includes operating a second air inlet orifice 242 either having a larger diameter to increase the volume of air introduced into the milk path or in combination with the other air orifice 240 to produce a combined additional volume. As noted, the air orifices can be the same size or different sizes to provide controllable flow rates of air into the system. Similar to the frothed milk discussion above, the milk and air are operated to push any residual liquids from the drain line whereupon the drain line is closed. The milk and air is run through the pumping system 200 for a predetermined period of time which is proportional to the volume or portion size to be dispensed.

Once again, a rinse cycle may be operated in the same manner as described above to remove residual milk from the main line 250 and milk line 100 for draining through the drain line 280 and through the drain valve 232.

In the cold frothed milk dispensing cycle the pump is operated at 50% speed. This increases the volume of milk dispensed and along with the increased airflow helps to provide loft in the milk and foam that retains shape during the dispensing cycle. The increased milk flow also helps improve the throughput time associated with the dispensing cycle.

Additionally, cold milk can be dispensed without the addition of air or steam. This may be desirable for producing cold beverages such as iced coffee or iced tea which incorporates milk. Maintaining the cold milk in an unfrothed condition can provide the desired results. When cold milk is to be dispensed, the pump 200 is operated at approximately 20 percent speed. The operation of the drain valve is consistent with that as described above with regard to the milk of the hot frothed milk operation.

During the final portion of time of this cold milk dispense cycle, the milk pump 200 speed is turned up to approximately 50% of capacity and the larger air inlet orifice 242 is opened. This operation helps to clear the milk lines of milk to help make cleaning the milk line more effective. Once again, a rinse cycle can be operated as described above with regard to the hot frothed milk.

Regarding the structures of the present disclosure, it has been found that the milk and steam orifices 106, 108, respectively, have a preferred generally rectangular and vertically oriented configuration. The relative orientation of the milk stream 100 and steam stream 130 are important to proper shearing of the milk. In this regard, the orientation of the steam relative to the milk helps produce a sheering effect which thoroughly integrates the steam energy into the milk to provide energy transfer while minimizing the amount of liquid or moisture carried in the steam stream. This helps to balance the characteristics of increasing the temperature rapidly while maintaining the time to a minimum time period to help improve the efficiency of the dispensing cycle. In this regard, it is important to control the volume of steam which is used to provide the desired heating effects on the milk, in combination with the air which is entrained in the milk, if air is used.

Additionally, it has been found that a generally circular orifice or port 114 at the intersection of the swirl chamber wall 122 instead of other shapes tends to significantly reduce or eliminate a whistling sound. Alteration of this orifice in other shapes tends to increase this whistling sound. In the interest of reducing unintended effects, a circular shape has been discovered to be preferred and is used in a preferred embodiment of the disclosed apparatus.

With regard to the laminators, while laminating blades 160 may be used on the inside surface of the nozzle, the laminator structure 170 may provide additional benefits. The ability to remove the entire structure may enhance the ability to clean the inside surfaces. While both structures are useful, there may be additional benefits with regard to the removable laminator 170. As noted above, the laminator structures 160, 170 are conducive to the introduction of flavors through the flavored dispensing component 60. With further reference to the figures, the flavor dispensing component is used to controllably dispense flavor to the milk stream 100 for appropriate, yet thorough combination with the milk stream 100 for mixing with the coffee, tea or other beverage ingredient.

With reference to the flavor dispensing component 60, it has been found that it is may be preferable to introduce the flavor downstream of the milk so as to prevent dispensing flavor onto the surfaces of the milk dispensing component. This introduction of the flavor ingredients at the exit port 310 prevents the concentrated flavoring ingredients dispensed by the flavor dispensing component 60 on the inside surfaces of the milk dispensing component. As such, a flavor delivery tube 170 has been coupled to a dispensing end 312 of the flavor dispensing component 60.

The flavor dispensing component 60 includes a series of valve assemblies 314 which are housed in a common manifold body 316. The manifold body 316 includes a series of passages which are angled along a common flow path 320 for dispensing into the flavor dispensing tube 174. As shown in the figures, the valve assembly 314 includes a quick disconnect port 330 which facilitates the quick and efficient sealed connection and disconnection of a flavor dispensing line 332 to each of the passages in the manifold 316. A positive displacement pump of known construction delivers the flavor ingredients through the line 332 to the valve assembly 314. Each valve assembly includes a shaft or stem 340 which includes a domed head 342 and a necked portion 344. A gasket 346 is carried in the necked portion 344. The stem 340 includes a generally conical base 350 and a compressible spring 352 retained between the base 350 and a shoulder 351 near the necked portion 344 and gasket 346. A flavor orifice 354 is formed in the body 356 of the valve assembly generally in the center of the shoulder area for passage of flavoring from the tube 332 through the body 356 and out through the orifice 354.

In use, a desired flavor is selected by the operator. A controller operates the positive displacement pump such as a peristaltic pump to pressurize the corresponding line 332. A volume of flavoring ingredient is pumped by the pump through the valve assembly 314 for dispensing into the main manifold passage or common flow path 320. It should be noted that a steam line 370 is coupled at the most upstream position of the manifold and attached to a similar valve assembly. Once the pump is actuated a steam valve is controlled to allow a portion of steam 370 to flow through the steam valve assembly 372 to flush the flavor ingredient through the main passage 320 for dispensing through the tube 174. A small additional amount of steam can be used at the end of the dispensing cycle to flush flavor ingredients from the main passage to prevent cross contamination of flavors between dispense cycles. This is accomplished by continuing the flow of steam 370 through the main passage 320 after stopping operation of the peristaltic pump.

The valve assembly 314 is operated by increased pressure against the base 350. The biasing spring 352 is chosen, and the flow rate of the pump is adjusted for the viscosity of the fluid so that controllable displacement of the valve stem is accomplished during a flavor dispensing cycle. The stem shifts along the central access 390 of the valve assembly against the spring force 352 to unseat the domed head 342 and associated gasket 346 from the orifice 354. Displacement along the axis 390 of the valve assembly 314 allows opening of the valve and passage of flavoring into the main passage 320. Once introduced into the main passage 320 the flavoring is picked up and rinsed by the steam 370.

The flavor dispensing system can controllably operate one or more flavoring ingredients at the same time to produce a variety of flavor combinations. For example, chocolate and hazelnut flavors can be dispensed at the same time to produce a third flavor in addition to the two component flavors. Additionally, after a predetermined number of cycles or on a periodic maintenance basis, steam can be flushed through the flavor dispensing manifold 316. This will help to use the energy, liquid, and velocity in the steam to thoroughly clean the components of the valve assembly which communicate with the main passage 320.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

The invention claimed is:

1. A milk dispensing system for dispensing milk products for use with a beverage dispensing machine, the milk dispensing system comprising:
    a mounting base for removable attachment to the beverage dispensing machine;
    a milk fitting coupled to the mounting base for connecting a milk source to the milk dispensing system;
    a steam fitting coupled to the mounting base for connecting a steam source to the milk dispensing system;
    a dual milk/steam component coupled to the mounting base;
    a milk passage extending through the component and communicating with the milk fitting for receiving milk therefrom;
    a steam passage extending through the component and communicating with the steam fitting for receiving steam therefrom;
    a swirl chamber having a wall defining a cavity therein;
    a mixing passage communicating with the cavity generally tangentially an inside surface of the wall defining the cavity;
    a steam orifice communicating with the steam passage and the mixing passage, steam flowing through the steam passage towards the mixing passage exiting the steam passage through the steam orifice;
    a milk orifice communicating with the milk passage and the mixing passage, milk flowing through the milk passage towards the mixing passage exiting the milk passage through the milk orifice;
    the milk orifice and the steam orifice communicating with the mixing passage proximate each other;
    steam exiting the steam orifice impinging on the milk exiting the milk orifice at an angle within the range of approximately 45-135 degrees relative to the milk flow path passing;
    the steam orifice delivering steam to the milk passing through the milk orifice and mixing therewith;
    milk and steam mixing in the mixing chamber and exiting the mixing chamber for further combination in the swirl chamber; and
    an exit port provided in the swirl chamber for draining the combined steam and milk from the swirl chamber.

2. The apparatus as set forth in claim 1 further comprising at least one controllable air inlet couple to and communicating with the milk passage for introducing air to the milk stream upstream of the combination of milk with steam.

3. The milk dispensing system of claim 1 further comprising an output nozzle removable coupled to dual milk/steam component, the nozzle defining a throat, the throat communicating with the cavity of the swirl chamber for directing the flow from the exit port.

4. The milk dispensing system of claim 1 further comprising a laminator structure removably positioned in the throat of the output nozzle.

5. The milk dispensing system of claim 1 further comprising a flavor dispensing assembly coupled to the dual milk/steam component for delivering flavor to the flow of milk and stream dispensed form the swirl chamber.

6. The milk dispensing system of claim 5 further comprising the flavor dispensing system including a flavor dispensing manifold having a plurality of flavor ingredient valve assemblies for controllably dispensing a flavor ingredient into another ingredient for producing a flavored beverage.

7. The milk dispensing system of claim 5 further comprising the flavor dispensing system for producing a milk ingredient for dispensing into a beverage and a flavor ingredient for dispensing proximate to or into the milk ingredient, the flavor dispensing portion introducing the flavor ingredient, downstream from the production of the milk ingredient to prevent cross contamination of the flavoring with the milk ingredient.

8. A milk dispensing assembly for use in producing at least one of: heated frothed milk, steamed milk, and unheated frothed milk, the assembly comprising:
a mounting base for removable attachment to the beverage dispensing machine;
a milk fitting coupled to the mounting base for connecting a milk source to the milk dispensing system;
a second fitting coupled to the mounting base for connecting a second source to the milk dispensing system;
a dual milk/second source component coupled to the mounting base;
a milk passage extending through the component and communicating with the milk fitting for receiving milk therefrom;
a second passage extending through the component and communicating with the second fitting for receiving an ingredient therefrom;
a milk orifice defined at a terminal end of the milk passage and a second orifice defined at a terminal end of the second passage,
the milk orifice and second orifices being positioned proximate to one another with the second orifice being positioned at an angle within the range of approximately 45-135 degrees relative to the milk flow path passing through the milk orifice for creating a shear effect on the milk in the milk flow path;
a swirl chamber having a wall defining a cavity therein, the swirl chamber communicating with the milk orifice and the second orifice to receive the combined milk and ingredient for controllably dispensing with beverage dispensed from the beverage dispensing machine;
a mixing passage communicating with the cavity generally tangentially an inside surface of the wall defining the cavity;
a second orifice communicating with the second passage and the mixing passage, ingredient flowing through the second passage towards the mixing passage exiting the second passage through the second orifice;
a milk orifice communicating with the milk passage and the mixing passage, milk flowing through the milk passage towards the mixing passage exiting the milk passage through the milk orifice;
the milk orifice and the second orifice communicating with the mixing passage proximate each other;
the second orifice delivering ingredient to the milk passing through the milk orifice and mixing therewith;
milk and the second ingredient mixing in the mixing chamber and exiting the mixing chamber for further combination in the swirl chamber; and
an exit port provided in the swirl chamber for draining the combined ingredient and milk from the swirl chamber.

9. The apparatus as set forth in claim 8 further comprising an intermediate passage which communicates with the milk and steam orifices, the intermediate passage leading to a cavity of a chamber for bringing together milk and steam in a swirling pattern to permit the creation of milk froth.

10. The apparatus as set forth in claim 8 further comprising an intermediate passage which communicates with the milk and steam orifices, the intermediate passage leading to a cavity of a chamber for bringing together milk and steam in a swirling pattern to permit the creation of milk froth.

11. The apparatus as set forth in claim 8 further comprising controllably passing heated milk though the milk passage and controllably passing steam through the steam passage for controlled combination with the heated milk for use in making steamed milk.

12. The apparatus as set forth in claim 8 further comprising controllably passing heated milk though the milk passage, controllably adding air to the heated milk, and controllably passing steam through the steam passage for controlled combination with the heated milk, the air being added to the milk upstream of the combination with the steam for use in making heated frothed milk.

13. The apparatus as set forth in claim 8 further comprising controllably passing unheated milk through the milk passage and controllably adding air to the unheated milk for making unheated frothed milk.

14. A milk dispensing assembly connectible to and for use in combination with a beverage dispensing machine for combining at least one of heated frothed milk, steamed milk, and unheated frothed milk with a beverage dispensed by the beverage dispensing machine, the milk dispensing assembly comprising:
a mounting base for removable attachment to the beverage dispensing machine;
a milk fitting coupled to the mounting base for connecting a milk source to the milk dispensing system;
a second fitting coupled to the mounting base for connecting a second source to the milk dispensing system;
a dual milk/second source component coupled to the mounting base;
a milk passage extending through the component and communicating with the milk fitting for receiving milk therefrom;
a second passage extending through the component and communicating with the second fitting for receiving an ingredient therefrom;
a milk orifice defined at a terminal end of the milk passage and a second orifice defined at a terminal end of the second passage;
the milk orifice and second orifices being positioned proximate to one another with the second orifice being positioned at an angle within the range of approximately 45-135 degrees relative to the milk flow path passing through the milk orifice for creating a shear effect on the milk in the milk flow path;
a swirl chamber having a wall defining a cavity therein, the swirl chamber communicating with the milk orifice and the second orifice to receive the combined milk and ingredient for controllably dispensing with beverage dispensed from the beverage dispensing machine;

a mixing passage communicating with the cavity generally tangentially an inside surface of the wall defining the cavity;

a second orifice communicating with the second passage and the mixing passage, ingredient flowing through the second passage towards the mixing passage exiting the second passage through the second orifice;

a milk orifice communicating with the milk passage and the mixing passage, milk flowing through the milk passage towards the mixing passage exiting the milk passage through the milk orifice;

the milk orifice and the second orifice communicating with the mixing passage proximate each other;

the second orifice delivering ingredient to the milk passing through the milk orifice and mixing therewith;

milk and the second ingredient mixing in the mixing chamber and exiting the mixing chamber for further combination in the swirl chamber; and an exit port provided in the swirl chamber for draining the combined ingredient and milk from the swirl chamber.

\* \* \* \* \*